United States Patent
Whitnah et al.

(10) Patent No.: US 9,571,442 B2
(45) Date of Patent: Feb. 14, 2017

(54) INTERFACE FOR SHARING POSTS ABOUT A LIVE ONLINE EVENT AMONG USERS OF A SOCIAL NETWORKING SYSTEM

(75) Inventors: Thomas Scott Whitnah, Mountain View, CA (US); Peter Deng, Mountain View, CA (US); Arieh Steinberg, Menlo Park, CA (US); Lior Abraham, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 381 days.

(21) Appl. No.: 13/620,351

(22) Filed: Sep. 14, 2012

(65) Prior Publication Data
US 2013/0014031 A1 Jan. 10, 2013

Related U.S. Application Data

(62) Division of application No. 12/646,838, filed on Dec. 23, 2009, now Pat. No. 8,997,006.

(51) Int. Cl.
*G06F 3/0481* (2013.01)
*H04L 12/58* (2006.01)
*G06Q 10/10* (2012.01)

(52) U.S. Cl.
CPC .............. *H04L 51/32* (2013.01); *G06Q 10/10* (2013.01)

(58) Field of Classification Search
CPC ................................ G06Q 50/01; G06Q 10/00
See application file for complete search history.

(56) References Cited

U.S. PATENT DOCUMENTS

| | | | |
|---|---|---|---|
| 7,685,132 B2 | 3/2010 | Hyman | |
| 7,783,592 B2* | 8/2010 | Armstrong et al. | 715/751 |
| 8,346,864 B1* | 1/2013 | Amidon et al. | 709/204 |
| 2008/0134040 A1* | 6/2008 | Pennington et al. | 715/733 |
| 2009/0132349 A1 | 5/2009 | Berkley et al. | |
| 2009/0199275 A1* | 8/2009 | Brock et al. | 726/4 |
| 2009/0293079 A1 | 11/2009 | McKee et al. | |
| 2009/0300502 A1 | 12/2009 | Johnson et al. | |
| 2010/0088336 A1 | 4/2010 | Johnston et al. | |
| 2010/0223119 A1* | 9/2010 | Klish | 705/14.26 |

(Continued)

OTHER PUBLICATIONS

"About Tinker Blog" Tinker.com, 2 pages, [online] [retrieved on Jul. 21, 2009] Retrieved from the internet <URL:http://www.tinker.com/blog/about/>.

(Continued)

*Primary Examiner* — Namitha Pillai
(74) *Attorney, Agent, or Firm* — Fenwick & West LLP (57) ABSTRACT

An external system (e.g., a website) is associated with an event and includes an interface that allows users to interact with streams of content associated with a social networking system. The interface allows a user to provide posts about the event via the interface, where the posts are displayed in the interface and also in a social networking interface on social networking system in connection with the user and other users associated with that user. The user can view, via the interface on the external system, posts from all users that are provided via the interface (e.g., everyone watching the event), thereby increasing the likelihood that the posts are relevant to the event. The user can also view, via the interface, posts from users associated with the user via the social networking system (e.g., friends of the user), regardless of where those are posted.

26 Claims, 5 Drawing Sheets

(56) References Cited

U.S. PATENT DOCUMENTS

| | | |
|---|---|---|
| 2010/0319034 A1 | 12/2010 | Mountain |
| 2011/0016014 A1 | 1/2011 | Tonnison et al. |
| 2011/0153451 A1* | 6/2011 | Bitz et al. .................... 705/26.7 |
| 2011/0314111 A1 | 12/2011 | Wang et al. |
| 2012/0331058 A1 | 12/2012 | Huston et al. |

OTHER PUBLICATIONS

"Facebook Live Feed," Facebook, 2010, 2 pages, [online] [retrieved on Jul. 21, 2009] Retrieved from the internet <URL:http://www.facebook.com/livefeed>.
"FAQ Tinker Blog," Tinker.com, 3 pages, [online] [retrieved on Jul. 21, 2009] Retrieved from the internet <URL:http://www.tinker.com/blog/faq/>.
"Free, customizable content stream and social network for your site—Socia . . . ," Thingfo, 13 pages, [online] [retrieved on Jul. 21, 2009] Retrieved from the internet <URL:http://things.thingfo.com/socialsite>.
"ICC Live Streamcast on Ustream," Ustream TV, 2 pages, [online] [retrieved on Jul. 21, 2009] Retrieved from the internet <URL:http://www.ustream.tv/channel/icc-live-streamcast>.
"Justin.tv—StreamCast Movies & Tv Programs," Justin.tv Inc., 2009, 5 pages, [online] [retrieved on Jul. 21, 2009] Retrieved from the internet <URL:http://www.justin.tv/streamcast/old>.
"Social TV: Watch Hulu with Your Facebook and MySpace Friends," mashable.com, 2009, 15 pages, [online] [retrieved on Jul. 21, 2009] Retrieved from the internet <URL:http://mashable.com/2009/04/28/social-tv/>.
"Social Web Blog: Introducing the Conversations element," Google, 2009, 4 pages, [online] [retrieved on Jul. 21, 2009] Retrieved from the internet <URL:http://googlesocialweb.blogspot.com/2009/05/introducing-conversations-element.html>.
"Thingfo blog," Thingfo, 13 pages, [online] [retrieved on Jul. 21, 2009] Retrieved from the internet <URL:http://blog.thingfo.com/>.
United States Office Action, U.S. Appl. No. 12/646,838, Nov. 7, 2013, twenty pages.
Wren, C., "Social Web Blog—powered by FeedBurner," Google Friend Connect, 25 pages, [online] [retrieved on Jul. 21, 2009] Retrieved from the internet <URL:http://feeds2.feedburner.com/SocialWebBlog>.
United States Office Action, U.S. Appl. No. 12/646,838, Mar. 27, 2014, 22 pages.
United States Office Action, U.S. Appl. No. 12/646,838, Jun. 5, 2013, 20 pages.
United States Office Action, U.S. Appl. No. 12/646,838, Apr. 11, 2013, 20 pages.
United States Office Action, U.S. Appl. No. 12/646,838, Oct. 17, 2012, 16 pages.
United States Office Action, U.S. Appl. No. 13/802,779, Nov. 30, 2015, twelve pages.
United States Office Action, U.S. Appl. No. 13/802,779, May 11, 2015, eleven pages.
United States Office Action, U.S. Appl. No. 13/802,779, Sep. 9, 2016, fourteen pages.

* cited by examiner

INTERFACE FOR SHARING POSTS ABOUT A LIVE ONLINE EVENT AMONG USERS OF A SOCIAL NETWORKING SYSTEM

CROSS-REFERENCE TO RELATED APPLICATIONS

The present application is a divisional of U.S. application Ser. No. 12/646,838, filed on Dec. 23, 2009, issued as U.S. Pat. No. 8,997,006, which is hereby incorporated by reference in its entirety.

BACKGROUND

The present invention relates generally to media presentation, and more particularly to an interface for sharing posts about a live online event among users of a social networking system.

Social networking systems include social utilities that track and enable connections between users (including people, businesses, and other entities). In particular, social networking systems allow users to communicate information more efficiently and to associate themselves with other users, thus creating a web of connections among the users of the social networking system. Users commonly share information with one another via the social networking system. A user can post text and content (e.g., photos, videos, music, links, or any other type of digital or other content that can be posted on the Internet) or a combination of both, and can post comments relating to other users and their posts. These types of user posts or "news stories" can be displayed to users in a feed or stream of content (either on a social networking website or elsewhere).

Posts and related comments by users sharing information on the social networking system sometimes tend toward particular topics or current events. When a noteworthy event has occurred or is in progress, many of the posts on the social networking system will be directed toward this event or related topics. A user interested in this event may be interested in reading the posts of other users directly relating to the event, many times in conjunction with concurrently watching or attending the event (e.g. the Super Bowl, the Oscars, the presidential inauguration, etc.). Yet, in a social networking system, posts related to a particular event are typically mixed in with a variety of unrelated content and can, therefore, be lost in the shuffle or difficult to follow.

Technology today allows many events to be captured and viewed on television, the Internet, etc. These broadcast accounts of events (e.g. via video, audio, text description, etc.) can be followed by users on television, websites, mobile devices, and so forth. A user can easily follow the broadcast of an event of interest while the event is actually happening or being broadcast. However, to share this event with other users of a social networking system, the user has to do so separately from following the event itself. Using means that are not associated with the event to post about the event may result in the user's post not being read by others until the post is stale and the event has ended or has moved on to a new topic. There is no easy way for the user to simultaneously follow an event outside a social networking system while interacting about the event in real time with other users of a social networking system (or other users following the event in general). There is also no mechanism for capturing and using these interactions back in the social networking system.

SUMMARY

Embodiments of the invention provide a system and method for receiving and displaying posts related to and concurrent with an event (or the presentation of an event in a case where the event is not broadcast or presented live). Embodiments of the invention also provide for the receipt and display of additional content that may be unrelated to the event. A user can make posts and share comments with others using an interface associated with an event. These users can be users of the social networking system, but they do not need to be.

The interface for receiving and displaying posts related to the event may be provided on an external system (e.g., a third party website or other system that is separate or distinct from the social networking system). In such an embodiment, the external system receives posts related to an event entered into the interface by users, which may be displayed in the interface as a stream of posts. The interface may also display in the stream (or in a separate stream in the same or a different interface) a stream of posts made by users on a social networking system which have been input into the social networking system rather than the external interface (e.g., status updates by users of the social networking system entered into the social networking system). These multiple streams can be viewed by the user in the interface of the external system. The viewing user's posts can be incorporated into any of these streams. The stream of posts from the social networking system displayed to the viewing user may also be limited to posts from users with whom the viewing user has a connection in the social networking system (e.g., the user's "friends," or "connections").

In this way, in one embodiment, an external interface provides the dual streams to a viewer: (1) a stream of posts about a particular event, entered into the external interface by people concurrently following that event; and (2) a stream of posts entered into a social networking system interface and received from the social networking system by the external interface. These posts are not necessarily related to the event and may be filtered to limit the stream of posts only to posts made by the viewing user's connections in the social networking system.

Moreover, many social networking systems display feeds or streams populated by posts made by users of the social networking system. Embodiments of the invention allow posts made by users of a social networking system through an external interface (e.g. posts related to a particular event) to be integrated into the streams on the social networking system. In this way, a user can communicate posts about a particular event made on an external system to the social networking system as the user is following the event, without needing to log into the social networking system and providing the posts directly to that system.

An illustrative embodiment of the above-described invention would where, Sam, a user of a social networking system is viewing a live streaming video of the Pipeline Masters surf content. Sam would be able to input posts about the contest into an external interface integrated into pipelinemasters.com. That external interface would display a stream of all posts input into the external interface on pipelinemasters.com by other viewers of the event for other users of the interface to view. At the same time, the external interface would display a separate stream containing posts of all of Sam's connections in the social networking system. Finally, all of Sam's posts entered through the external interface on pipelinemasters.com would also be displayed to Sam and his connections on the social networking website associated with the social networking system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

A social networking system offers its users the ability to communicate and interact with other users of the social networking system. Users join the social networking system and then add connections to a number of other users to whom they desire to be connected. As used herein, the term "connection" refers to any user (whether an individual or other entity) of the social networking system to whom another user has formed a connection, association, or relationship via the social networking system (connections may sometimes also be referred to as "friends"). Connections may be added explicitly by a user or automatically created by the social networking system based on common characteristics of the users (e.g., users who are alumni of the same educational institution). Connections in a social networking system can be one or two-way connections. For example, if Bob and Joe are both users and connected to each other in the social networking system, Bob and Joe have a two-way connection. If Bob is interested in learning more information about Joe, but there is not a reciprocal connection, a one-way connection may be formed with Bob being connected to Joe, but Joe not being connected to Bob. The connection between users may be a direct connection; however, some embodiments of a social networking system allow the connection to be indirect via one or more levels of connections. The social networking system keeps a record of information for each user and the connections among the users. The record of users and their connections in the social networking system may be called a "social graph." As used herein, a "social network" is a collection of other users to whom a user is connected in the social networking system. A "social networking system," is the collection of hardware and software that implements a service that allows a collection of users (e.g., a social network) to communicate and interact with one another.

The social networking system can be a social networking website, as described in some examples below, but can also be implemented in other ways, such as with an application that obtains information about a user's profile from the social networking system using, e.g., application programming interfaces (APIs). The external system can be any system that is not a part of the social networking system. The external system can be a website (e.g., a third party website separate or distinct from the social networking website, or hosted on or using a separate machine, server, subnetwork, URL, domain, etc.), but could also be implemented in other manners. A social networking system can also be implemented as one of several features of another website, network or system. In such cases, the social networking system may simply add a social component to a website with other features and services. The external system can have one or more interfaces for receiving and displaying posts by users or streams of user posts, referred to here as "external interfaces," which can be managed or provided by the social networking system or the external system. The social networking system can have one or more interfaces for receiving and displaying posts by users or streams of user posts, referred to here as "social networking interfaces," which are managed/provided by the social networking system.

Figure 1:
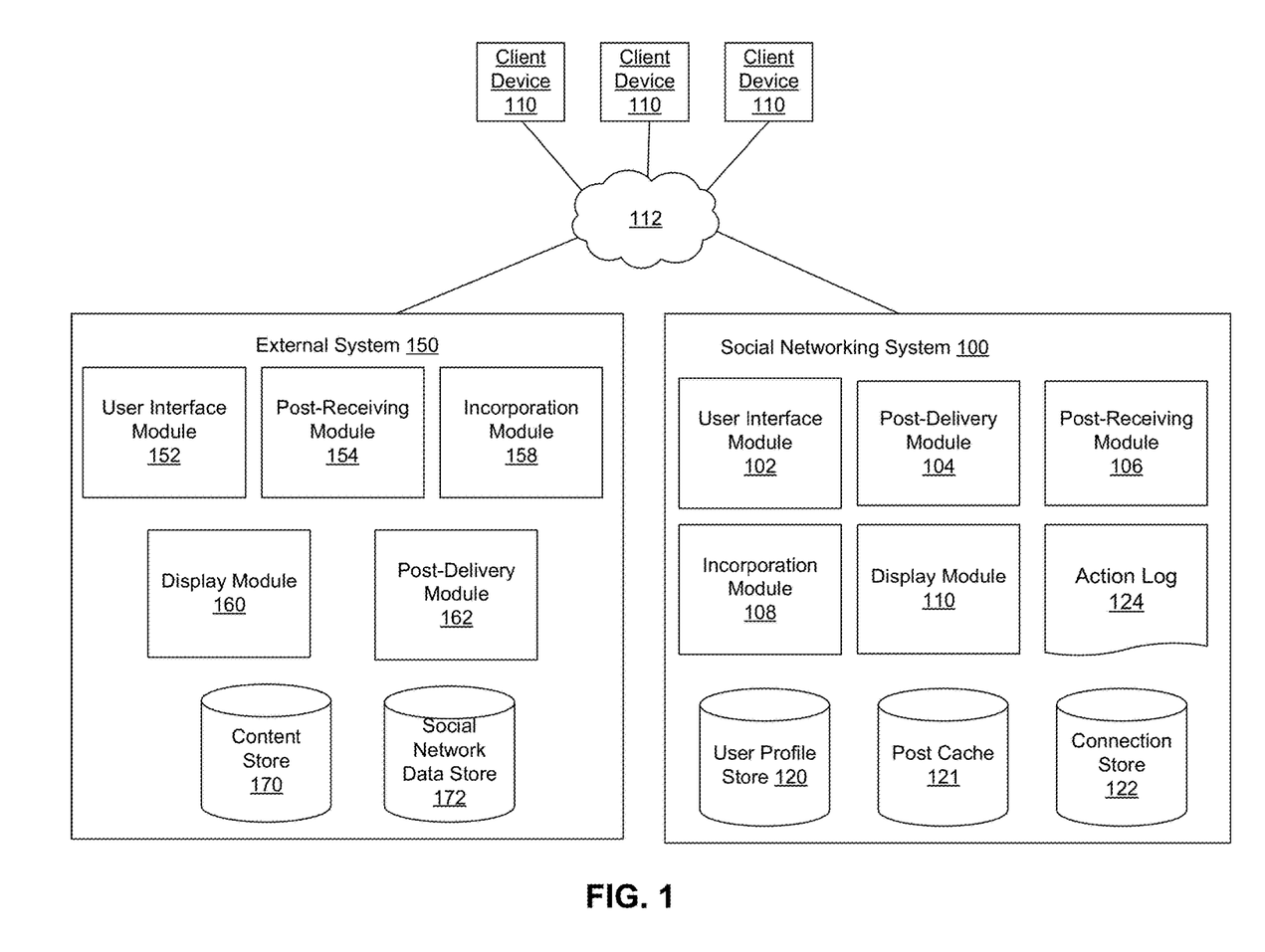
FIG. 1 is high-level diagram illustrating how an external system can interact with a social networking system and client devices, in accordance with one embodiment of the invention.

FIG. 1 is high-level diagram illustrating how an external system can interact with a social networking system and client devices, according to an embodiment of the invention. FIG. 1 illustrates an external system 150, a social networking system 100, and client devices 110 connected by a network 112. Only three clients 110 are shown in FIG. 1 in order to simplify and clarify the description, though embodiments can have thousands or millions of clients 110, as well as multiple external systems 150 and social networking systems 110.

The client devices 110 comprise one or more computing devices that can receive user input and can transmit and receive data via the network 112. For example, the client devices 110 may be desktop computers, laptop computers, smart phones, personal digital assistants (PDAs), or any other device including computing functionality and data communication capabilities. The client devices 110 are configured to communicate via network 112, which may comprise any combination of local area and/or wide area networks, using both wired and wireless communication systems.

The social networking system 100 comprises a computing system that allows users to communicate or otherwise interact with each other and access content as described herein. The social networking system 100 can comprise any entity that provides social networking services, communication services, dating services, and so forth (social networking systems do require a website to operate). For example, the social networking system 100 can comprise a social networking website that allows one or more users at the client devices 110 to communicate with one another via the website. In one instance, the user associated with the client device 110 may communicate with the user associated with another of the client devices 110 via a social networking website that offers the user an opportunity to connect with one or more other users (e.g., social network friends).

Systems outside of the social networking system 100, called external systems 150, can receive or access information available in the social networking system 100. Users of the external system 150 can be users of a social networking system 100. The external system 150 can access information from the social networking system using, for example, an API provided by or associated with the social networking system 100. The social networking system 100 can also provide information (e.g., streams of content from users of the system 100) to the external system/interface. The external system 150 may use the information obtained from the social networking system 100 for various purposes (e.g., for display on an interface on the external system 150) or may simply allow the information to be displayed by the social networking system 100 on an interface on the external system.

FIG. 1 contains a block diagram of the social networking system 100, according to an embodiment. The social networking system 100 includes a user interface module 102, communication module 103, a post-delivery module 104, a posteceiving module 106, an incorporation module 108, a display module 110, a user profile store 120, a post cache 121, a connection store 122, and an action log 124. FIG. 1 also contains a block diagram of the external system 150, according to an embodiment. The external system 150 includes a user interface module 152, a post receiving module 154, an incorporation module 158, a display module 160, a post delivery module 162, a content store 170, and a social network data store 172. In other embodiments, the social networking system 100 or the external system 150 may include additional, fewer, or different modules for various applications. Conventional components such as network interfaces, security mechanisms, load balancers, failover servers, management and network operations consoles, and the like are not shown so as to not obscure the details of the system.

The social networking system 100 stores user profiles in the user profile store 120. Profiles contain information about users of a social networking system, such as biographic, demographic, work experience, educational history, hobbies or interests, location, and the like. The user profile store 120 can also store information regarding a user's privacy settings that indicate which other users can view the user's information (e.g., everyone, friends only, friends of friends, certain groups of friends, etc.). The user can designate certain information as private, while other information is public (e.g., access to his profile photo for all users, but access to other photos only for friends or particular groups of friends). The user can define privacy settings in advance, which can be stored in the store 120 and can be adjusted later if desired. The user can also define one or more settings in real-time or as needed. For example, a user might post a status update on the social networking system 100 and select a setting of "post to everyone on live feed." In this case, that update can be included in the live feed on the interface of the external system 150. Similarly, the user might post content on the external system 150, and can select privacy settings for that type of content. Thus, each user's posts can be displayed in accordance with the privacy settings of those users (e.g., displayed only to certain users, displayed only on certain external websites, etc.).

The social networking system 100 further stores data describing one or more connections between different users in the connection store 122. The connection information may indicate users who have similar or common work experience, group memberships, hobbies, educational history and so forth. Additionally, the social networking system 100 includes user-defined connections between different users, allowing users to specify their relationships with other users. For example, these user-defined connections allow users to generate relationships with other users that parallel the users' real-life relationships, such as friends, co-workers, partners, and so forth. Users may select from predefined types of connections, or define their own connection types as needed. The connection store 122 thus stores all connection formed by users within the social networking system.

Figure 4:
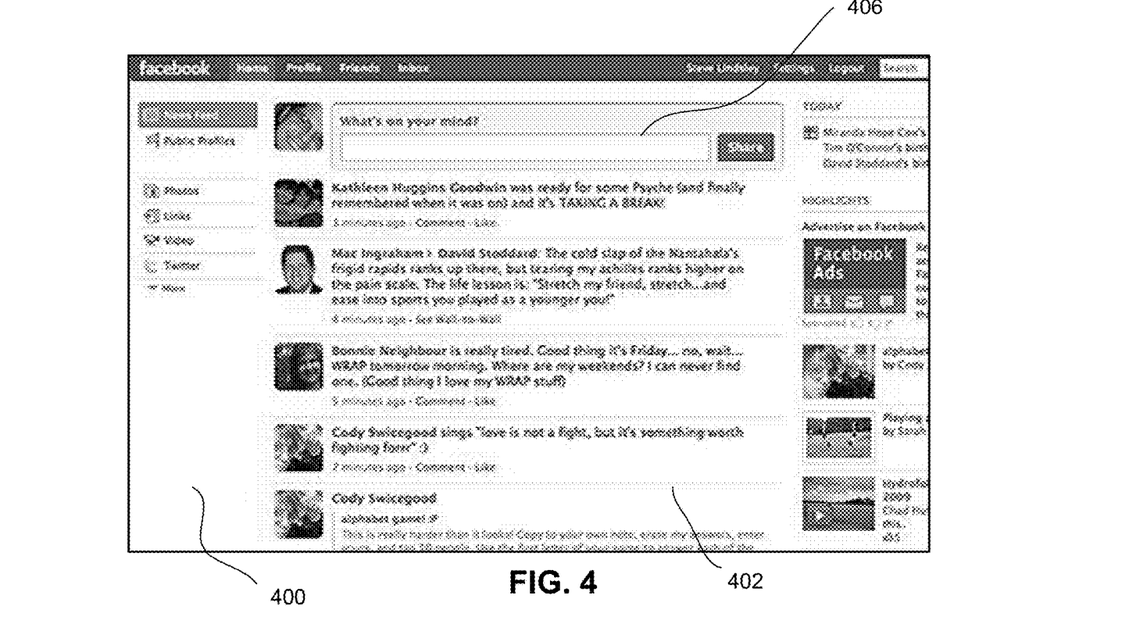
FIG. 4 is an example of a social networking interface of a social networking system, in accordance with one embodiment of the invention.

The social networking system 100 also provides a social networking interface with which users can interact (described in more detail regarding FIG. 4). The interface allows a user to post content (e.g., videos, photos, links, text, etc.). For example, the user might post a status update indicating that the user is "going on a trip this weekend to the Grand Canyon." This post may then be displayed to a number of other users, such as the poster's connections (e.g., friends) in a stream of content called a stream, news feed or a live feed. This content stream communicates information that may be relevant to each particular user of the social networking system. Where the social networking system 100 is a social networking website, the stories can be presented to a user via one or more web pages of the social networking website, for example in each user's home page or news feed page.

Other types of content can also be included in the stream of posts. For example, the social networking system 100 can store information related to user actions on and/or off the social networking system 100, and these actions can then be reported in the stream of posts. The actions taken by users are recorded in the action log 124 (e.g., a database of entries in which an entry is added for each action). After an amount of time, the action log 124 will become populated with a number of entries, and thus will contain a very rich set of data about the actions of the users. This data can be analyzed and filtered to identify trends and relationships in the actions of the users, as well as affinities between the users and various objects. The news content relating to actions taken by users might notify the user that another user associated with him posted new photos, commented on something, added a connection to another user, or otherwise took an action that could be of interest to the user. The content can provide a quick summary (e.g., a few lines) regarding that particular action taken by the other user, which is incorporated into the stream of posts provided to the user. Thus, each user is provided with a stream of posts comprising one or a few lines of text, content (e.g., photos, videos, hyperlinks, music, etc.), user comments, advertising, and any other type of content capable of being posted on the Internet (or a combination of these items).

As stated above, the external interface on the external system 150 can be provided by and managed by either the external system itself or by the social networking system 100. In embodiments in which the external system 150 manages the external interface, the external system 150 includes the modules shown in FIG. 1 that operate as described below. In embodiments in which the social networking system 100 manages the external interface, the external system 150 may not have certain of the components shown in FIG. 1, and the actions described below for these external system modules may be performed by the correspondingly-named modules in the social networking system 100.

Referring now to the modules of the external system 150 illustrated in FIG. 1, the user interface module 152 provides/displays an interface on an external system 150 as a forum for receiving and displaying posts related to an event. In embodiments in which the social networking system manages the interface on the external system 150, the user interface module 102 of the social networking system 100 can provide (or can operate with module 152 to provide) this interface for the external system 150. The event can be a live event, and streaming media content regarding this event can be provided alongside or in association with the interface. The external interface can be any type of user interface, such as a graphical user interface (GUI) or a web-based user interface (WUI). Where the external system 150 is website, the event can be a live online event displayed on a web page as streaming content. A web-based user interface can be provided for this streaming event. The event can be a historical or noteworthy event, such as a presidential election or inauguration. For example, the event might be live-streaming news coverage of the presidential inauguration provided in a window on a web page of a news website, such as CNN.com. However, the interface can be associated with any type of an event, such as a sporting event, a musical concert, a news item, or any other event (e.g., live, televised, broadcast, etc). The interface is described in more detail below regarding FIGS. 2 and 3.

The post-receiving module 154 receives posts provided in the interface by users. In embodiments in which the social networking system 100 manages the external interface, the post receiving module 106 of the social networking system 100 can receive (or can operate with the module 154 to receive) the posts in the manner described below for module 154. The interface can include a post field, into which a particular user can insert one or a few lines of text. For example, a user watching a sporting event might insert into the post field of the interface associated with that event a post such as "What an amazing play he just made!" In some embodiments, the particular user is not limited to providing lines of text in the interface, but can attach or otherwise provide other items, including photos, videos, links, event or calendar items, etc. The particular user can also comment on other user's posts or indicate that he likes/dislikes a user's post (e.g., by selecting a like/dislike link, a thumbs up/down icon, or in other similar ways).

The post-receiving module 154 not only receives a post related to the event entered into the interface on the external system by the particular user, in one embodiment, but the module 154 also receives a number of other posts related the event entered into the interface by other users. In some embodiments, however, there is no post-receiving module 154 in the system, or the module 154 represents simply the interface itself into which posts are entered. Where the interface is associated with a live event, the interface can receive posts on the event from many users (e.g., thousands or millions) as the event is occurring. Since the interface may be provided on the external system 150 in association with the streaming data associated with the event, the users can enter posts as the event is happening, without having to rely on a separate location for entering posts. Where the external system 150 is a website displaying a live streaming event, the user can enter posts directly into the web page, without having the move to a separate web page for post-entering (e.g., a web page of a social networking website).

The post-receiving module 154 can also receive a stream of posts from the social networking system 100. The posts are generated by the social networking system based on actions of one or more users of the social networking system. For example, the action can include the user's entry of a post or status update into a social networking interface, the user's posting of a photo or video, the user's forming of a new connection to another user, the user's joining of a fan club for a product or business, the user's posting of or subscribing to a new event, the user's using of an application, the user's tagging of another user in a photo/video, and any other action that can be performed by a user of a social networking system 100 (e.g. actions on the social network, actions on third party sites elsewhere on the Internet, actions at physical locations, etc.). As explained above, the social networking system 100 can provide a live feed or news feed of content to users of the system 100. This stream of content includes stories about various users, including their posts, comments, status updates, news about their actions, etc. Typically, a user receives on the social networking system 100 a feed of information about other users with whom he is connected in the social network (e.g., friends of the user). This stream of posts that is provided to the users on the social networking system 100 can also be provided for display on the external interface.

The post-receiving module 154 can receive posts or the stream of posts from the social networking system 100 in a number of ways. In one embodiment, the social networking system 100 comprises an API interface that other entities, such as websites or client applications, can access. The external system 150 can call one or more of these APIs and retrieve information about a user entering posts into the external system interface. The term "API" refers to sets of technologies that allow entities, such as websites, to interact using Simple Object Access Protocol (SOAP), JAVASCRIPT®, and other technologies. For example, the social networking website, FACEBOOK®, has incorporated into its platform an "open stream API" that allows users and other entities, including external systems 150, to read and interact with streams of social network content anywhere. Where the API is an open stream API, the external system 150 can receive streams of data from the social networking system 100 (e.g., a live feed of content regarding the user's social network friends). External systems 150 can directly access a stream of social network content associated with a given user, on behalf of that user, and can then display the content in the manner most relevant for the user experience (e.g., by filtering, remixing, or displaying the stream in different manners). Using this open stream API, users can also publish back into the stream, add comments, provide likes/dislikes, and otherwise interact with the with any stream item through any interface that publishes to the stream. In other embodiments, no APIs are necessary for the external system 150 to receive and display the stream, and the external system 150 has and needs no additional data about the stream, the posts, or the user connections. For example, where the social networking system 100 manages the external interface, the social networking system 100 can display or deliver the stream of posts to the external interface. In this case, an API is not used for accessing the stream that is displayed in the interface.

For displaying a user's social network content when the user is accessing the external system 150, the user may be required to log into an account associated with the social networking system 100 or may otherwise be asked to provide identifying information. The user may be able to log in or provide information without leaving the external system 150 (e.g., without having to navigate to a social networking website). This log-in or information-providing step may be required in order for the external interface to receive or display the stream, or in embodiments in which APIs are used, this step may be required for the external system 150 to be able to call the APIs or otherwise access the social network information. In some embodiments, the social networking system 100 asks for the user for approval for providing of his information to the external interface. The user can also give approval in advance, such as an approval on the social networking system 100 for any display of or access of his content by external systems, or by certain defined external systems (e.g., all news websites, or a list of specific approved websites).

Similarly, the user can give approval to provide only certain information, which may be governed by privacy settings. In some embodiments, this pre-approval data by the user can be stored by the social networking system 100 for streamlining or avoiding the log-in process for future events that the user views. In other embodiments, the user's log in or other identifying data can be stored by the external system 150 in the social network data store 172. Where the pre-approval data is stored by the social networking system 100, the social network data store 172 may be absent from the external system 150. In some embodiments, one or more universal web identity systems can be used in providing streams of posts on the external system 150. These types systems can provide standard mechanisms for authenticating users by allowing users to log into different services using a universal digital identity (e.g., OpenID). In some cases, these systems allow users to connect to their social networking identities or accounts (e.g., including profile, friends, privacy settings, applications, etc.) via third party systems or websites (e.g., FACEBOOK® Connect). In this manner, such a universal ID system can be used on the external system 150 to allow to access social networking information while viewing a live online event.

The stream of posts received by module 154 can be the same stream displayed on the social networking system 100 in the social networking interface. However, the stream received or provided on the external system 150 can also differ. In one embodiment, the user can apply one or more filters to view only certain of the content from the social networking system 100. For example, the user can view content relating only to certain subgroups of friends. The user can also view only content entered into a particular field on the social networking website (e.g., content entered into a particular fan site, which could be more relevant to the event on the external system 150). The user can also filter the posts to include only posts relating to the event (e.g., a filter by key word searching, by entry into particular fields, or by another manner of distinguishing between posts on different topics). Similarly, the user can elect to view only posts from his connections that were entered into the external interface. The module 154 can continue to receive the stream of posts from the social networking system 100 as the event is occurring and during the entire event. In some embodiments, the module 154 receives the stream of posts for a certain period of time (e.g., 10 minutes, 30 minutes, an hour, two hours, etc.) before and/or after the event, for a pre- and post-discussion of the event.

The incorporation module 158 incorporates posts from the user into the stream of other posts entered into the external interface and into the stream of posts received from the social networking system 100. As the user continues to post into the interface of the external system 150, the module 158 continues to incorporate the posts into these streams of content. In other embodiments, the external system 150 does not include an incorporation module 158, and instead the user's posts are included with the stream of posts from the social networking system 100 or the incorporation module 108 of the social networking system 100 manages (or operates with module 158 to manage) the incorporation.

The display module 160 displays the stream of content, which may include the user's own posts, on the external system (or other location where the streams are displayed). In other embodiments, the display module 110 of the social networking system 100 manages (or operates with module 160 to manage) the display on the external system (or elsewhere). In one embodiment, the user can view two different streams of content. First, the user can view a stream of posts entered into the external interface associated with an event. These posts are likely related to the event since they are made concurrently with the event and in some cases in the same interface that is broadcasting the event. Second, the user can view a stream of posts from a social networking system of which the user is a member. These posts may or may not be related to the event since some of them are provided in an interface separate from the event (e.g., on a social networking website). This stream of posts provided to the user can be limited to content entered by the user's connections (e.g., friends of the user). In this manner, the user can have a conversation with his social network connections while viewing the event. One or more of the user's connections may also be viewing the event and may be entering posts via the external system interface. Thus, in some embodiments, the stream of posts from the user's connections may be limited to posts entered in the external interface, so those posts will likely be relevant to the event. In one embodiment, the posts by the user's connections can be displayed both in the general stream of posts about the event (e.g., the first stream described above), and the stream of posts originating from the social networking system 100.

The streaming content can be displayed in a number of different ways. In one embodiment, the external interface includes one or more views or viewing means (e.g., tabs, buttons, icons, etc.) the user can select to view information. For example, the interface can provide a general or "everyone watching" tab that the user can select to view the stream of all posts entered via the external interface. The external interface can also provide a connections or a "friends" tab that the user can select to view the stream of posts filtered to show only his connections'/friends' posts. This "friends" tab stream can include posts entered by the user's connections in the external interface, in the social networking interface, or in both. In this embodiment, the two tabs allow a user to switch between viewing the two streams. Other mechanisms can also be used for allowing users to select between the streams. In other embodiments, the two streams are provided simultaneously (e.g., side-by-side) on the external system 150. In further embodiments, only one stream is provided, or additional streams beyond the two streams are provided (e.g., different streams of content relating to a user's particular social network groups). Posts from any of these streams may also be displayed in other arrangements and may also be ordered in different ways (e.g. relevance, chronological, etc.).

In some embodiments, the user can view these streams of content as he is viewing the event. The posts can be updated in real time so the posts are always up to date. In this manner, posts remain relevant to what is occurring in the event. In some embodiments, the external system 150 provides the streams of content associated with the event to the social network data store 172 for storage. The event content itself may also be made available for storage in the content store 170. When this content is stored, users can view the event and associated streams of content at a later time. In other embodiments, no storage takes place making the social network data store 172 and the content store 170 unnecessary.

The post-delivery module 162 manages the delivery of content from the external system 100 to the social networking system 100. The post-delivery module 162 provides the social networking system 100 with posts users make through the external system interface. In other embodiments, the post-delivery module 162 is absent from the system 150, and the social networking system 100 has access to the posts directly (e.g., using module 104 or 106). These posts can be provided/accessed in real-time, as they are entered into the interface. These posts can then be included in a stream of posts or news feed displayed on the social networking system 100. In this manner, the user's connections/friends that are accessing the social networking system 100 can be immediately appraised of posts the user makes while viewing and posting about an event on an external system 150. The user's connections/friends can also respond to or comment on the user's posts via the social networking interface. These responses and/or comments can be displayed to the user in the stream on the external interface.

One or more mechanisms can be used to identify from where a given post originated. In one embodiment, an icon, a link, or some other identifier is included with certain posts that denotes whether that post originated on the social networking system 100 or the external system 150. For example, the identifier can indicate that certain of the posts that a user is viewing on the social networking system 100 were entered on an external interface of an external system 150. The identifier can also provide information about the particular live event with which the posts are associated (e.g., identifying the live event, providing the time/date of the live event, and other data about the event). In another embodiment, the identifier or icon includes text or a small image. The identifier can also provide sponsorship data or an advertisement associated with the live event. For example, posts on the external system 150 relating to a live event can be displayed on the social networking system 100 with information from a sponsor of that live event (e.g., "Brought to you by Audi").

Referring now to the modules of the social networking system 100 illustrated in FIG. 1, a user interface module 102 provides the social networking interface for receiving posts by social networking system users. The module 102 also manages communications between the social networking system 100 and the external system 150. In some embodiments, the module 102 also provides the external interface for receiving and displaying posts related to an event, as described above regarding module 152. The user interface module 102 receives a request from an external system to provide a particular user a stream of posts (e.g., posts made or other actions taken on the social networking system 100). In some embodiments, the external system 150 requests that the social networking system send the content to the external system 150 or otherwise provide access to the content. In some embodiments, the request is made through an API. The request can also include identifying information or log-in data for the user for whom the content is being requested. In other embodiments, no request is received by the social networking system 100. The system 100 simply provides the information without request. The request may also be prompted by a user logging to the external interface using his social networking login credentials, clicking on a "friends" tab or otherwise interacting with the external interface, and so forth.

The social networking system 100 can also include a post cache 121 for storing posts by users entered on the social networking interface and/or the external interface. In one embodiment, when a user's connections post content in either interface, some or all of these posts (or data regarding these posts) can be stored in the post cache 121 until the user requests a stream of content from his connections (e.g., by clicking on a "friends" tab on the external interface, by clicking on a live feed link in the social networking system 100, by refreshing a web page, etc.). In another embodiment, all or part of the posts from a user's connections can be dynamically generated/provided by the social networking system 100 when the user requests a stream of content from his connections. The stream of posts by connections of a given user (e.g., shown via the "friends" tab) will be unique to that user. The stream can include posts by the user's connections in the social networking interface, in the external interface, or in both. In a further embodiment, the post cache 121 stores posts entered on the external interface for providing a global stream of content to users when users request a stream from everyone watching the event (e.g., by clicking on an "everyone" tab on the external interface). The stream provided via the "everyone" tab can include anyone on the external system posting via the external interface, or can include only users having accounts with or otherwise registered with the social networking system 100 (e.g., by prompting users to log in to or sign up with the social networking system 100 to post content). Since this global stream is not unique to any particular user, it can be shared amongst users. The global stream of posts will be updated more frequently since it includes a larger set of users, and so caching the global stream allows for more efficient streaming of content and focus of rendering resources, etc. Similarly, since updates occur less frequently to the "friends" tab stream, more resources can be focused on the global stream. In some embodiments, all or part of the post cache 121 can be associated with the external system 150 or can otherwise be located outside of the social networking system 100. In further embodiments, some or all of the posts for the "friends" tab and "everyone" tab may be stored in content store 170 of the external system 150.

The post-delivery module 104 manages the delivery of content to the external system 100 from the social networking system 100. The post-delivery delivery module 104 provides to the external system the requested stream of posts for display to the user on the external interface. In some embodiments, the module 104 is an API that provides the content by providing access to the content via the API. In other embodiments, the module 104 itself accesses the external interface and displays the content. The content may also be delivered or accessed according to the user's privacy settings or sharing settings/authorizations. In some embodiments, the module 104 receives a request to provide for a particular user a stream of posts entered into the social networking interface by the user's connections, and the module 104 can the providing of this request stream of posts for display to the particular user in the external interface.

The post-receiving module 106 can access or receive posts entered into the external system interface. Specifically, the module 106 accesses/receives a post related to an event entered into the interface on the external system by a user. As explained above, in one embodiment, the post delivery module 162 of the external system 150 provides user posts to the social networking system 100 as these posts are entered into the external system interface. The module 106 receives these provided posts. In other embodiments, the module 106 itself accesses the posts or receives the posts via the external interface. In some embodiments, the module 106 also receives via the social networking interface posts by users of the social networking system.

The incorporation module 108 incorporates the posts accessed/received from the external system into a stream of posts on the social networking system 100. Thus, content provided to the user and/or his connections on the social networking system 100 can include posts the user made on the external system.

The display module 110 displays posts accessed/received from the external system to the user and/or his connections on the social networking system 100. Users accessing the social networking system 100 can thus view posts made on the external system interface by their social networking system connections (and may also respond to these posts using the social networking system interface). In embodiments in which the social networking system 100 manages the external interface, the module 110 provides for display via the external interface posts from users of the external system.

External System Interface

Figure 2:
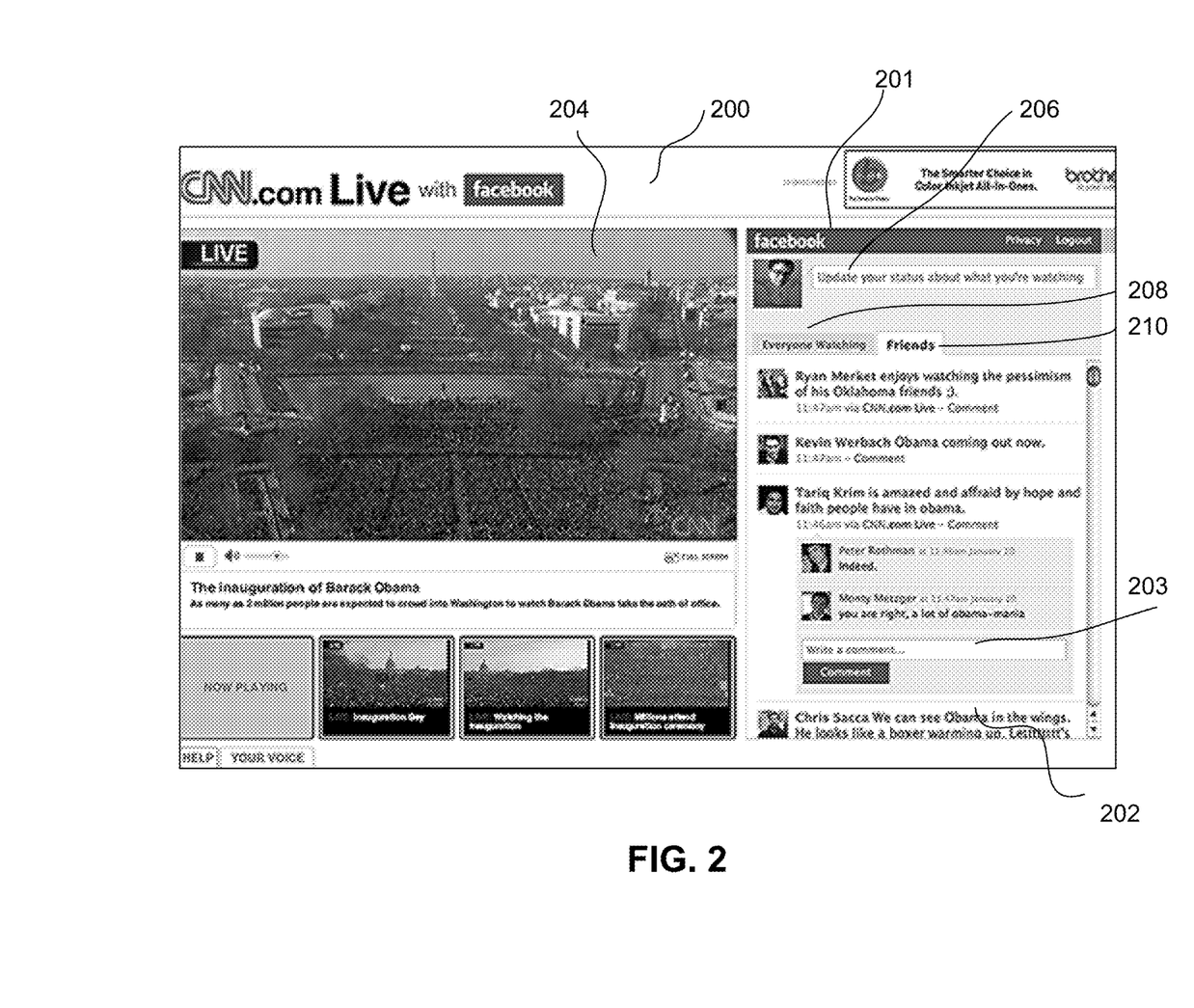
FIG. 2 is an example of an interface of an external system, in accordance with one embodiment of the invention.

FIG. 2 is an example of an interface 201 of an external system 150, in accordance with one embodiment of the invention. The external system 150 in this example is a portion of a web page 200, CNN.com, providing a live feed of the presidential inauguration. The interface 201 is shown on the right-hand side of the web page 200 next to the event display 204 (though the interface 201 can be arranged in other manners on the page, for example, located in various portions of the page or having different levels of transparency or size). The interface 201 in this example is an interface associated with the company FACEBOOK®, though other social networking system interfaces can be used as well. The interface 201 includes a posts field 206 at the top of the interface 201 in which the user can make posts (e.g., text, images, videos, link, etc.).

Below the posts field 206 is the stream of posts 202 displayed in the interface 201. In this embodiment, each post in the stream is associated with a user by other identifying information, such as a photo, a time entered, etc. In other embodiments, posts can be associated with users by other information or can be completely anonymous (the existence and nature of identifying information can also be left up to the user). There is also provided a "comment" link that a first user can click on to open up a box below a second user's post. The first user can use this box to make a comment about the second user's post. The third comment from the top in FIG. 2 provides an example of a post with additional comments. The box provides a comments field 203 for users to input comments on other posts.

Immediately below the posts field 206 are two tabs. The first tab is an "everyone watching" tab 208, and the second tab is a "friends" tab 210. The user can click on the first tab 208 to view the stream of posts 202 by those using the external interface associated with the event (e.g., all posts entered into the post field 206 whether the viewing user knows the poster or not). The user can also click on the second tab 210 to switch the stream of posts 202 made by his connections on the social networking system 100, whether they relate to the event or not and whether they were entered into the post field 206 of the external interface or via an interface on the social networking system 100 (in this case the FACEBOOK® website).

Figure 3:
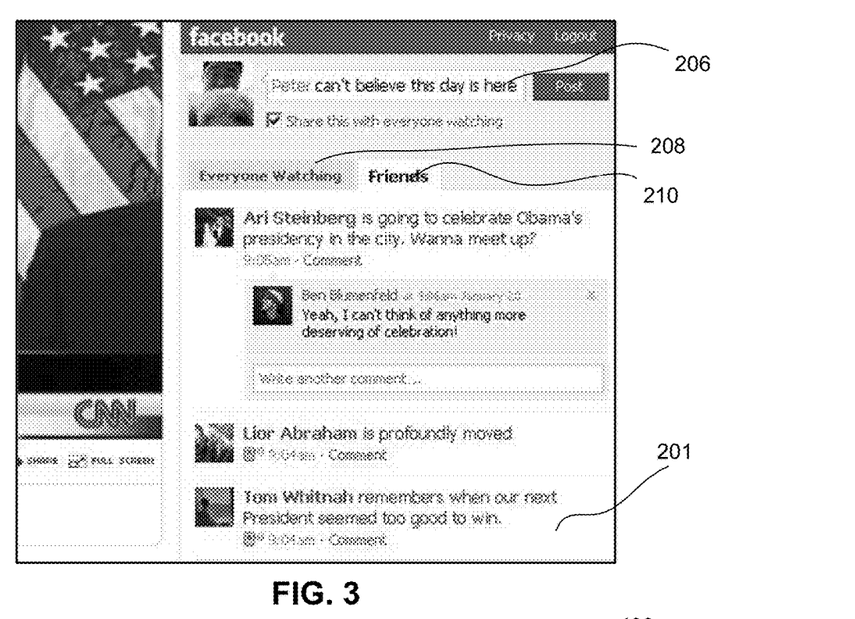
FIG. 3 is an example of another view of the interface of an external system, in accordance with one embodiment of the invention.

FIG. 3 is an example of another view of the interface 201 of an external system 100, in accordance with one embodiment of the invention. Again, the interface shows the two tabs 208, 210. At the top, right-hand corner, the user can select a link to review the privacy options associated with the interface 201. The user can also select the link to logout, which will allow him to log out of his social networking system account. To the right of the post field 206, the user can select the "Post" button to post whatever content he has entered into the field 206. Below the post field 206, the user can click a check box to indicate whether or not he would like to share his posts with everyone watching the event or just with his social network connections.

Social Networking Interface

FIG. 4 is an example of a social networking interface 400 of a social networking system, in accordance with one embodiment of the invention. Like the external system interface 201, the social networking interface 400 includes a post field 406 for users make post (e.g., text, photos, videos, links, etc., or a combination thereof). Also like the external system interface 201, the social networking interface 400 includes a stream of posts, specifically a stream of posts 402 or stories relating to users of the social networking system 100 (and can include posts related to entities and activities external to the social networking system 100). When a user posts in the post field 206 of the external system interface 201, the system can be set up so the post appears in the stream of posts 402 displayed on the social networking system (e.g., to the user and his friends). Similarly, when a user posts in the post field 406 of the social networking interface 400, the post can be displayed in the external system interface 201 to his connections or others viewing the event on the external system 150.

Receiving and Displaying Posts about an Event in an External System

Figure 5:
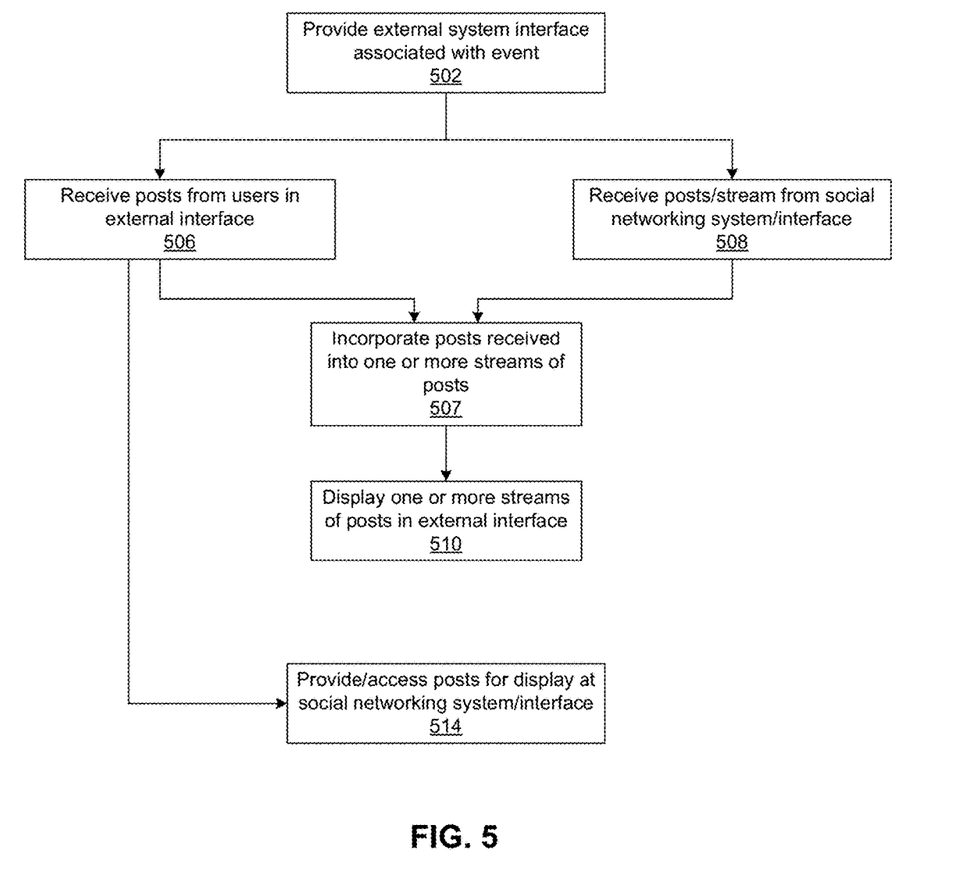
FIG. 5 is a flow chart illustrating the steps performed on the external system in receiving and displaying posts, in accordance with one embodiment of the invention.

FIG. 5 is a flow chart illustrating the steps performed on the external system 150 for receiving and displaying posts entered into an external interface and a social networking interface, in accordance with one embodiment of the invention. The steps illustrated in FIG. 5 can be performed by the social networking system 100 (e.g., where the social networking system 100 provides the external interface on the external system 150 and manages the receiving/displaying of streams about the event on the external system 150) or by the external system 150 (e.g., where the external system 150 provides the external interface and manages the receiving/displaying of streams about the event on the external system 150). The social networking system 100 or the external system 150 provides 502 or otherwise includes an interface (e.g., interface 201) on the external system 150 for receiving and displaying posts (e.g., in real time) related to an event (e.g., a live online event). The external system 150 or the external interface receives 506 one or more posts related the event entered into the external interface by users. For example, the system 150 can receive 506 posts entered into the external interface by a user and the user's connections, and also by other users to whom the user is not connected (e.g., everyone on the external system 150). These posts will likely be about the event since they are entered into the external interface related to the event. In some embodiments, the system 150 or interface further receives 508 posts or a stream of posts from the social networking system 100 by users of the social networking system. These posts may or may not be about the event since they were entered into the social networking interface on the social networking system 100. In some embodiments, the external interface provides (or the user may be able to select between viewing) a stream of posts entered into the in the external interface by his connections (which are likely about the event), a stream of posts entered into the social networking interface by his connections (which may or may not be about the event), or a stream including both.

The system 150 incorporates 507 posts received 506, 508 from either or both of these sources into the interface on the external system (into one or more streams of posts/content). The external interface then displays 510 for the user one or more streams of posts. As explained above, multiple streams can be viewed independently. In some embodiments, the user can click on tabs for viewing different streams of content, or the streams can be provided simultaneously.

Providing Social Network Posts to an External System

Figure 6A:
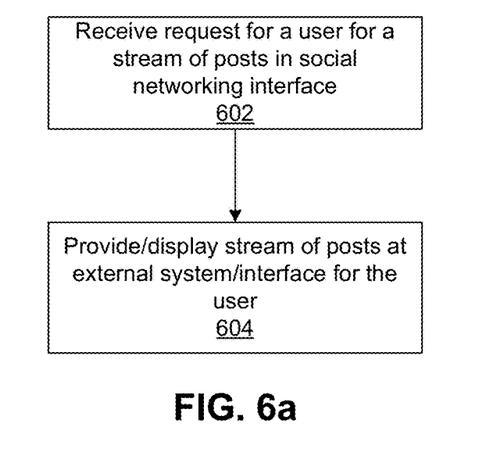
FIG. 6a is a flow chart illustrating the steps performed by the social networking system in providing, to an external interface, posts entered into a social networking interface, in accordance with one embodiment of the invention.

FIG. 6a is a flow chart illustrating the steps performed by the social networking system 100 in providing to the external system/interface posts entered into a social networking interface, in accordance with one embodiment of the invention. The social networking system 100 receives 602 a request via the external system 150 to provide a stream of posts for a user (e.g., posts made on a social networking system 100) made by the user's connections/friends. As explained above, this request can be an attempt to access an API of the system 100. This request received 602 can also be any other type of indication that a stream of posts should be provided (e.g., a user login attempt, a user interaction with the external interface, a user selection of a "friends" tab on the external interface, etc.). The system 100 provides 604 the stream of posts (via API or other mechanism) to the external system/interface or otherwise displays the requested stream of posts. This stream will be displayed to the user (for whom it was requested) in the external system interface.

Receiving and Displaying Posts about an Event in a Social Networking System

Figure 6B:
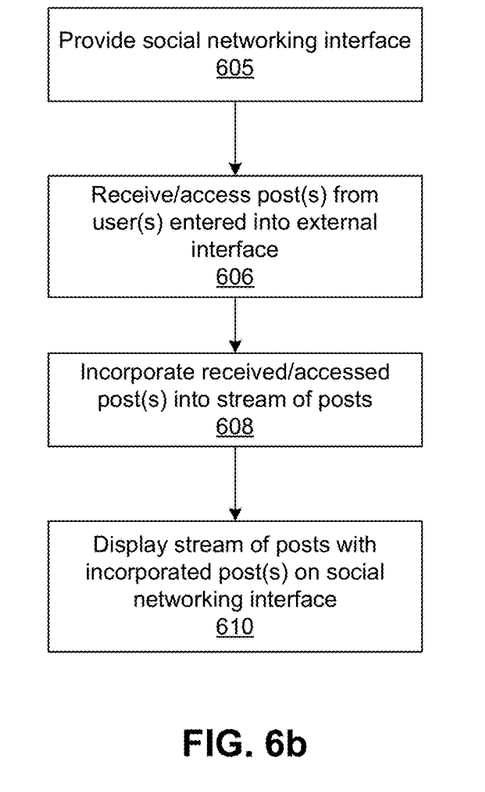
FIG. 6b is a flow chart illustrating the steps performed by the social networking system in receiving and displaying posts about an event entered via an external interface, in accordance with one embodiment of the invention.

FIG. 6b is a flow chart illustrating the steps performed by the social networking system 100 in receiving and displaying posts about an event entered on an external interface, in accordance with one embodiment of the invention. The social networking system 100 provides 605 a social networking interface with which users can post content to their connections in the social networking system 100. The system 100 further receives 606 from the external system 150 or external interface one or more posts related to the event entered into the external interface by the user. In fact, the system 100 can receive many posts entered by multiple users. In some embodiments, the system 100 receives 606 information by accessing this information from the external system. The system 100 incorporates 608 the posts received into a stream of posts and displays 610 this in the social networking interface on the social networking system 100. This content plus the user's post is displayed on the social networking system 100 to the user and to the user's connections.

With FIGS. 5, 6a and 6b, the method is illustrated in a flowchart for clarification and ease of presentation. However, many of these steps are occurring constantly and concurrently. For example, a number of users are entering post at one time into the external interface and into the social networking interface. A number of streams of content are being displayed to many users on both systems 100, 150 at a time. Similarly, the systems 100, 150 can constantly and simultaneously be sending/receiving/accessing content from each other for display.

While various embodiments have been described above, it should be understood that they have been presented by way of example only, and not limitation. For example, any of the elements associated with the dynamically selected media presentation may employ any of the desired functionality set forth hereinabove. Thus, the breadth and scope of a preferred embodiment should not be limited by any of the above-described exemplary embodiments.

Embodiments of this invention may also include a computer readable storage medium having embodied thereon a program, the program being executable by a processor for performing a method, as described herein, for providing dynamically selected media content to a user of an electronic device in a social network environment.

What is claimed is:

1. A computer-implemented method comprising:
providing, by a social networking system, an external interface on an external system, the external interface for receiving and displaying posts in real time alongside a streamed display of a live online event;
receiving, at the external interface, a first plurality of posts related to the live online event by a plurality of users of the external system;
providing a social networking interface on the social networking system for receiving posts by users of the social networking system;
receiving, at the social networking interface, a second plurality of posts by a plurality of users of the social networking system;
providing for display to a user of the external system via the external interface, a first tab of the external interface comprising one or more posts of the first plurality of posts received at the external interface by one or other users, each of the one or more posts relating to the live online event; and
responsive to the user having one or more connections in the social networking system:
providing a second tab of the external interface comprising one or more posts of the second plurality of posts received at the social networking interface by the one or more connections of the user; and
providing for display to the connections of the user via the social networking interface one or more posts by the user received at the external interface of the external system.

2. The method of claim 1, wherein the social networking system is a social networking website, and wherein the external system is a third party website, the social networking interface provided at the social networking website.

3. The method of claim 2, wherein the external interface is provided at the third party website.

4. The method of claim 1, wherein one or both of the one or more posts of the first plurality of posts and the one or more posts of the second plurality of posts are displayed as a stream of posts.

5. The method of claim 1, wherein posts provided for display via the external interface and posts provided for display via the social networking interface are displayed at the same time.

6. The method of claim 1, wherein certain of the posts received via the external interface are displayed via the social networking interface on the social networking system with an icon or an identifier that signifies that a given post came from a user interacting with the external interface.

7. The method of claim 1, wherein the posts are selected from a group consisting of: hyperlinks, videos, photos, and text.

8. The method of claim 1, wherein the posts provided by a user via the social networking interface are displayed via the external interface in accordance with privacy settings of the user.

9. The method of claim 1, further comprising applying one or more filters to a stream of posts provided for display to the user.

10. The method of claim 9, wherein applying a first filter limits displayed posts on the second tab of the external interface to posts related to the live online event.

11. The method of claim 1, wherein the first plurality of posts received by the external interface are updated in real time and concurrently with the live online event.

12. The method of claim 1, wherein the second plurality of posts received by the social networking interface is updated in real time and concurrently with the live online event.

13. The method of claim 1, wherein displaying the posts in real time alongside the streamed display does not obscure the streamed display of the live online event.

14. The method of claim 1, wherein the displayed posts are displayed in a first window and the live online event is displayed in a second window, the first window and the second window not overlapping.

15. The method of claim 1, wherein one or more of the second plurality of posts received at the social networking interface are associated with the live online event.

16. A computer-implemented method comprising:
providing, by a social networking system, an external interface on an external system, the external interface for receiving and displaying posts in real time alongside a streamed display of a live online event;
receiving, at the external interface, a first plurality of posts related to the live online event by a plurality of users of the external system;
providing a social networking interface on the social networking system for receiving posts by users of the social networking system;
receiving, at the social networking interface, a second plurality of posts by a plurality of users of the social networking system;
providing for display to a user of the external system via the external interface, a first tab of the external interface comprising one or more of the first plurality of posts received at the external interface by one or more other users of the external system, a second tab of the external interface comprising one or more of the second plurality of posts received at the social networking interface by one or more other users; and
responsive to the user having one or more connections in the social networking system, providing for display to the one or more connections of the user via the social networking interface one or more posts by the user received at the external interface of the external system, the displays to the user and to the one or more connections occurring at the same time and concurrent with the live online event.

17. The method of claim 16, wherein the social networking system is a social networking website, and wherein the external system is a third party website, the social networking interface provided at the social networking website, the external interface provided at the third party website.

18. The method of claim 16, wherein one or both of the first plurality of posts and the one or more posts of the second plurality of posts are displayed as a stream of posts.

19. The method of claim 16, wherein certain of the posts received via the external interface are displayed via the social networking interface on the social networking system with an icon or an identifier that signifies that a given post came from a user interacting with the external interface.

20. The method of claim 16, wherein the posts provided by a user via the social networking interface are displayed via the external interface in accordance with privacy settings of the user.

21. The method of claim 16, further comprising applying a first filter to a stream of posts received by the user limiting the displayed posts on the second tab of the external interface to those related to the live online event.

22. The method of claim 16, wherein the first plurality of posts received by the external interface is updated in real time and concurrently with the live online event.

23. The method of claim 16, wherein the second plurality of posts received by the social networking interface is updated in real time and concurrently with the live online event.

24. The method of claim 16, wherein displaying the posts in real time alongside the streamed display does not obscure the streamed display of the live online event.

25. The method of claim 16, wherein the displayed posts are displayed in a first window and the live online event is displayed in a second window, the first window and the second window not overlapping.

26. The method of claim 16, wherein one or more posts of the second plurality of posts received at the social networking interface are associated with the live online event.

* * * * *